United States Patent [19]

Brown et al.

[11] Patent Number: 5,331,020
[45] Date of Patent: Jul. 19, 1994

[54] ORGANOSILICON COMPOUNDS AND COMPOSITIONS CONTAINING THEM

[75] Inventors: Scott S. D. Brown, Barry; Peter C. Hupfield, Brynteg Parc, both of Wales; Peter Y. K. Lo, Midland, Mich.; Richard G. Taylor, Barry, Wales

[73] Assignee: Dow Corning Limited, Barry, Wales

[21] Appl. No.: 107,103

[22] Filed: Aug. 16, 1993

Related U.S. Application Data

[62] Division of Ser. No. 976,114, Nov. 13, 1992, Pat. No. 5,270,423.

[51] Int. Cl.$^5$ ............................................. C08F 2/46
[52] U.S. Cl. ........................................ 522/99; 427/515; 522/59; 522/64; 522/65; 522/66; 522/67; 522/68; 522/148; 522/172
[58] Field of Search ................... 522/99, 148, 172, 59, 522/64, 65, 66, 67, 68; 427/515

[56] References Cited

U.S. PATENT DOCUMENTS

| | | | |
|---|---|---|---|
| 4,311,821 | 1/1982 | Weitemeyer et al. | 528/15 |
| 4,801,725 | 1/1989 | Arai et al. | 556/434 |
| 5,145,901 | 9/1992 | Feder | 524/424 |
| 5,166,295 | 11/1992 | Herzig et al. | 528/15 |
| 5,231,157 | 7/1993 | Herzig et al. | 528/15 |

FOREIGN PATENT DOCUMENTS

| | | | |
|---|---|---|---|
| 0058909A1 | 2/1982 | European Pat. Off. | C09D 3/82 |
| 0462389A2 | 5/1991 | European Pat. Off. | C08G 77/18 |

Primary Examiner—Melvyn I. Marquis
Attorney, Agent, or Firm—Timothy J. Troy

[57] ABSTRACT

Organosilicon compounds with a siloxane portion and groups of the general formula —OR'OCH=CHR" (i) linked via an Si—O—C bond, wherein R' is a divalent hydrocarbon radical or a group —R°—(OR°)$_n$—, wherein R° is alkylene and n is from 1 to 12, R" is H or alkyl are useful in radiation curable compositions, in which they are mixed with an initiator. The compositions are particularly useful in UV radiation curable relase coatings.

11 Claims, No Drawings

ORGANOSILICON COMPOUNDS AND COMPOSITIONS CONTAINING THEM

This is a divisional of copending application(s) Ser. No. 07/976,114 filed on Nov. 13, 1992, U.S. Pat. No. 5,270,423.

The invention is concerned with organosilicon compounds having alkenyl-ether functionality and with a method of making such compounds. The invention is also concerned with compositions which contain such organosilicon compounds and their use.

Alkenyl-ether functional organosilicon compounds have been described in a number of publications. European Patent specification 105 341 describes and claims organopolysiloxanes having at least one Si-bonded vinyloxy functional group of the formula $H_2C=CH-O-G-$, where G is alkylene or alkylene interrupted by at least one of a divalent hetero-radical selected from $-O-$, divalent phenylene or substituted divalent phenylene or combinations of such hetero-radicals. U.S. Pat. No. 4,707,503 describes among others aliphatic unsaturation-containing organopolysiloxanes containing at least two of the organosiloxane units represented by the general unit formula

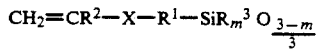

in which $R^1$ is a divalent hydrocarbon group, $R^2$ is a hydrogen atom or a methyl group, $R^3$ is a substituted or unsubstituted monovalent hydrocarbon group, X is a group $-O-(CH_2)_2S-$ and m is a number or 0, 1 or 2. European Patent specification 396 130 describes alkenyloxy-functional organosilicon compounds which have per molecule at least one Si-bonded group of the formula $-(CH_2)_2-R^2-(AR^3)_z-OCH=CH-CH_2-R$, wherein A denotes $-O-$, $-S-$, or $-C(O)O-$, $R^2$ denotes a linear or branched alkylene group with 1 to 7 carbon atoms or a cycloalkylene group with 5 to 7 carbon atoms, $R^3$ denotes a linear or branched alkylene group with 2 to 4 carbon atoms which may be substituted with a hydroxyl, methoxy, ethoxy or trimethyl siloxy group, R denotes a hydrogen atom or an alkyl group having 1 to 4 carbon atoms and z has a value of 0, 1 or 2.

A process for making the compounds of the prior art, though not described in the second of the cited specifications, involves the hydrosilylation reaction as explained in E.P. 105 341 and E.P. 396 130. The process as described in the former of these includes the provision of a compound having both allyl and vinyloxy functionality and the reaction of this compound with a silicon-containing compound containing at least 0.5 weight percent terminal or pendant Si-H groups in the presence of a platinum catalyst. The latter of the cited documents requires a hydrosilylation reaction between a compound of the formula $CH_2=CH-R^2-(AR^3)_z-OCH_2-CH=CH-R$ with an organosilicon compound having at least one Si-bonded hydrogen atom in the presence of a hydrosilylation catalyst, followed by a second step which effects the transfer of the carbon-carbon double bond to the carbon bonds neighbouring the ether oxygen by heating the compound in the presence of an appropriate catalyst, e.g. Ruthenium complexes having phosphine ligands.

Hydrosilylation, though effective, is not the most convenient of processes not least because of the cost of the ingredients and catalyst, but also because of the danger of poisoning the catalyst. We have also found that the use of compounds having both vinylether and allyl functionality in hydrosilylation reactions does not give the desired yield of 100% reaction on the allyl side. This results in some organosilicon compounds being present which have allylether functionality instead of vinylether functionality. Where cationic polymerisation is desired such allyloxy functional materials remain inactive in the process. Although the process described in E.P. specification 396 130 overcomes this particular problem organosilicon compounds made by this route cannot have vinylether functionality, which is the preferred functionality, especially where cationic polymerisation systems are intended. It is also desirable to make compounds having alkenylether functionality in a single process step avoiding the need to introduce a second step and a second catalyst. There is therefore a need to provide alkenyloxyfunctional organosilicon compounds by a different route which results in an improved yield of the desired products.

Patent application WO 91/11467 describes alkenylether silicates of the general formula $(X)_{4-n}Si(OR_1OCH=CHR_2)_n$ wherein X is halogen, $-OR$ where R is a lower alkyl, a mixture of halogen and $-OR$, a mixture of $-OR$ and hydrogen or a mixture of hydrogen and halogen; $R_1$ contains from 1 to 8 carbon atoms and is alkylene, alkenylene, alkynylene, optionally alkoxylated with up to 20 units of

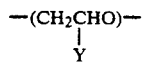

where Y is hydrogen or methyl, $R_2$ is hydrogen or lower alkyl and n has a value of from 1 to 4. Also described are radiation curable compositions which comprise 1 to 60% by weight of the above alkenylether silicates, 30 to 99% of a polymerisable vinylether, epoxyether, epoxyacrylate and/or vinyloxy alkyl urethane and 0.1 to 5% by weight of a photoinitiator. The alkenylether silicates are stated to be rapidly curable at ambient temperatures by UV and visible light or other sources of radiation. However, such silicates would cure to a very brittle and unacceptable film which is why the radiation curable compositions mix these silicates with polymerisable organic materials. There is a need for a composition which reduces the number of components whilst retaining a useful cured composition after exposure to radiation and a fast curing rate.

We have now found that improved alkenyloxy functional organosilicon compounds provide suitable materials for radiation curable compositions.

The invention accordingly provides in a first aspect an organosilicon compound having a siloxane portion and at least one group of the general formula

 (i)

linked to a silicon atom via an Si—O—C bond, wherein R' is a divalent hydrocarbon radical having up to 8 carbon atoms or a group of the formula $-R°-(OR°-)_n-$, wherein R° denotes an alkylene group having up to 6 carbon atoms and n has a value of from 1 to 12, R" denotes a hydrogen atom or an alkyl group having up to 10 carbon atoms.

The organosilicon compound of the invention has preferably at least one unit of the general formula $$O_{\frac{4-a-b-c-d}{2}}Si(-OR'OCH=CHR'')_aR_bY_cX_d \quad \text{(ii)}$$

wherein R' and R" are as defined above, R is a monovalent hydrocarbon or substituted hydrocarbon group having up to 18 carbon atoms, X is a hydrocarbonoxy group having up to 8 carbon atoms, Y is a group having the formula $$R'SiR_bO_{\frac{3-b'}{2}},$$

wherein R' links the silicon atom of unit (ii) to the silicon atom of the group Y, a has a value of from 1 to 4, b and b' have a value of from 0 to 3, c has a value of 0 or 1, d has a value of from 0 to 2, a+b+c+d having a value of from 1 to 4 provided at least one of $$\frac{4-a-b-c-d}{2} \text{ in } (ii) \text{ and } \frac{3-b'}{2}$$

in Y is not 0, any other units if present in the organosilicon compound having the general formula $$SiR_bO_{\frac{4-b}{2}} \quad \text{(iii)}$$

wherein R and b are as defined above, the oxygen atoms, where present, in $$SiO_{\frac{4-a-b-c-d}{2}} SiO_{\frac{3-b'}{2}}, \text{ and } SiO_{\frac{4-b}{2}}$$

linking silicon atoms to form siloxane bonds.

Organosilicon compounds according to the invention may be siloxane homopolymers or copolymers. Where siloxane homopolymers are intended units of formula (ii), in which the value of a+b+d is at most 3, may be used. These homopolymers may vary from disiloxanes to high molecular weight polymers. At least one Si—O—Si bond is to be present which may occur either where a+b+c+d is at most 3 or where a+b+c+d=4 and b' in Y is at most 2. Preferred as siloxanes however are copolymers having units of both formula (ii) and formula (iii). Copolymers also may vary from disiloxanes to polysiloxanes. They may be linear or branched polymers. Units of formula (ii) may be present in small or large proportions, ranging from 1 per molecule to 99.9% of all units. A particularly preferred copolymer is a substantially linear polymer in which units of formula (ii) are present as end-blocking units. The invention includes also in its scope polymers where units of formula (ii) are within the siloxane chain, thus providing pendant groups of the formula —OR'OCH=CHR" and polymers which combine units of formula (ii) as end-blocking groups and groups within the siloxane chain. Preferably c in formula (ii) is only equal to 1 when a+b+c+d is equal to 4.

Each R in the organosilicon compounds according to the invention may be the same or different from other groups R. Each R is a monovalent hydrocarbon or a substituted hydrocarbon e.g. alkyl, aryl, alkylaryl, arylalkyl, alkenyl, halogenated alkyl or halogenated aryl. Examples of suitable R groups include methyl, ethyl, isopropyl, butyl, phenyl, tolyl, vinyl, allyl, cyclohex-enyl, cyclohexyl, hexyl, trifluoropropyl and chlorophenyl. Preferably at least 60% of all the R groups in the organosilicon compound according to the invention are lower alkyl groups having up to 4 carbon atoms or aryl groups, more preferably at least 80%. Most preferably substantially all R groups present in said organosilicon compounds are lower alkyl or aryl groups, especially methyl or phenyl groups. R' is a divalent hydrocarbon, for example alkylene or arylene compound, e.g. methylene, ethylene or phenylene or a group of the formula —R°—(OR°)n—, for example —(CH₂)-3[O(CH₂)₃]₃—. Preferably R' is an alkylene group having up to 6 carbon atoms, most preferably 2 to 4 carbon atoms, e.g. ethylene, propylene or isobutylene. R" may be a hydrogen atom or an alkyl group having up to 10 carbon atoms. It is preferred that R" is either hydrogen or a lower alkyl group, having up to 4 carbon atoms. Hydrogen or methyl are the most preferred R" groups. Where the organosilicon compounds according to the invention are intended for use in cationic polymerisation processes, the use of H is most preferred, as this material is more active than those where R" is alkyl. Groups X may be any hydrocarbonoxy group but preferably are alkoxy or aryloxy groups, more preferably lower alkoxy having up to 6 carbon atoms, most preferably methoxy or ethoxy.

Siloxane polymers according to the invention are preferably substantially linear compounds, i.e. those in which the value of 4-a-b-c-d in (ii) or 3-b' in Y of (ii) and 4-b in (iii) is 2 for the majority of siloxane units in the polymer. Small amounts of trifunctional (i.e. the value of 4-a-b-c-d in (ii), 3-b' in Y of (ii) or 4-b in (iii) is 3 or tetrafunctional siloxane units (i.e. the value of 4-b in (iii) is 4 may, however, also be present causing a certain amount of branching in the polymers. The units of formula (ii) may be end-blocking units (i.e. the value of 4-a-b-c-d is 1 or where c=1 the value of 3-b' in Y is 1) or they may be units in units in the polymer chain (i.e. the value of 4-a-b-c-d is 2 or 3, where c=1 the value of 3-b' in Y is 2 or 3. It is preferred that in each unit (ii) present as end group of the polymer, where either 4-a-b-c=1 or 3-b' in Y=1, that a is 1, 2 or 3, b is 0, 1 or 2, c is 1 and d is 0. More preferably a is 3, b is 0, c is 1 and b' in Y is 2. Where unit (ii) is in the siloxane chain it is preferred that either a+b+c+d is 2 or a+b+c+d is 4 and b' in Y is 1. In such units it is particularly preferred that respectively a=1, b=1 and c and d=0 or that a is 3 and c=1, b and d being 0. Most preferred are those polymers where units of formula (ii) are end groups a=3, c=1 and b' in Y=2.

Organosiloxanes according to the invention may have any number of siloxane units which may all have the formula (ii), or which may be a mixture of units of the formulae (ii) and (iii). These siloxanes may vary from small molecules, e.g. disiloxanes, to high molecular weight materials with a DP (degree of polymerisation) of several thousands. The choice of molecular weight and of mole % units (ii) will depend on the intended use of the polymer. For example if a liquid material is desired, the DP may conveniently be in the range of e.g. from 4 to 400. Where a more viscous material is preferred, the DP could have a value of from 1000 to 4000 or more. If a polymer with limited reactivity is desired the number of units of formula (ii) may be as low as 1 or 2 per molecule, in some cases resulting in a molar percentage of from 0.1 to 5% based on the number of siloxane units in the molecule. On the other end of the scale homopolymers consisting only of units of formula (ii) may also be prepared. Particularly preferred are polysiloxanes having a degree of polymerisation from 20 to 500, more preferably 40 to 250.

The invention provides in another of its aspects a method of making organosilicon compounds according to the first aspect of the invention by a process which comprises reacting together a reagent organosilicon compound having at least one silicon-bonded group A, wherein A denotes a group —OR" or a group —N(R'-')—C(O)—R" wherein R" is as defined above, with a compound of the general formula HOR'OCH=CHR". Where such organosilicon compounds are silanes they should have reactive silicon-bonded groups which are then hydrolysed or cohydrolysed, or otherwise reacted with other silanes or siloxanes according to known methods. For example Some A groups would be left on the reaction product and could be condensed with other Si—A groups of similar silanes or of siloxanes. It is, however, more preferred that the organosilicon compound having a silicon-bonded group A is a polysiloxnae. Suitable polysiloxanes include alkoxy functional siloxanes wherein silicon-bonded alkoxy groups may be at terminal siloxane units or may be pending in the siloxane chain. A combination of pending and terminal silicon-bonded A groups is also suitable.

It is preferred that when A denotes a group —OR", R"OH has a lower boiling point than HR'OH at 25° C. under atmospheric pressure. If the opposite is true high pressure is required to force the transalkoxylation of this reaction.

Preferred reagent organosilicon compounds have a siloxane portion and at least one unit of the general formula

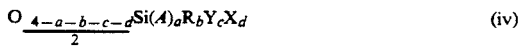

$$O_{\frac{4-a-b-c-d}{2}}Si(A)_aR_bY_cX_d \qquad (iv)$$

wherein R, X, Y, a, b, c and d are as defined above and A denotes a group —OR" or a group —N(R")—C(O)—R". Silanes wherein the value of a+b+d is 4 are known materials and have been described in a number of publications. Many such silanes are commercially available. Examples of suitable silanes include trimethylsilanol, dimethylvinylsilanol, methyltrimethoxysilane, tetra ethoxysilane and bis(methylacetamido)methylvinylsilane. Siloxanes which are suitable as reagent organosilicon compounds are also known in the art and several of them are commercially available. Other suitable materials are easily prepared according to methods which are well known in the art of organosilicon chemistry.

Examples of suitable siloxanes for use as reagents in the method of the invention include α,w-dimethylsilanol end-blocked polydimethylsiloxanes, methyldimethoxysiloxane end-blocked polydimethylsiloxanes and trimethylsiloxane end-blocked (dimethylsiloxane)(trimethoxysilylethylmethylsiloxane) copolymer. Suitable siloxanes may be prepared by a number of methods which are known in the art. These methods include, for example, the reaction of hydrosiloxanes with silanes having one or more silicon-bonded A groups and an unsaturated hydrocarbon group, able to react with silicon-bonded hydrogen atoms of the hydrosiloxanes in the presence of a noble metal catalyst. Examples of suitable silanes for this addition reaction include vinyltrimethoxysilane, vinylmethyldimethoxysilane and vinyldimethylmethoxysilane. Hydrosiloxanes are known and may be prepared by rearrangement of cyclic siloxanes, e.g. cyclic dimethylsiloxanes and/or cyclic methylhydrogensiloxanes with suitable end-blocking organosilicon compounds, e.g. tetramethyldisiloxane or hexamethyldisiloxane. Alternative methods include the manufacture of α,w, Si—A containing polydiorganosiloxanes by rearrangement of cyclic siloxanes in the presence of suitable end-blocking organosilicon compounds having Si—A groups.

Compounds of the general formula HOR'OCH=CHR" which are suitable for the transesterification reaction of the method according to the invention are also well-known materials and many are commercially available. R' may be for example methylene, dimethylene, isobutylene, phenylene or —(CH$_2$)$_3$[O(CH$_2$)$_3$]$_3$— and R" may be hydrogen, methyl, ethyl, propyl, hexyl or nonyl. Suitable compounds include hydroxybutylvinylether, hydroxypropylvinylether, p-phenolvinylether, hydroxybutyl-2-methylvinylether or H[O(CH$_2$)$_2$]$_3$—OCH=CH$_2$.

Catalysts for the preparation of the organosilicon compounds according to the invention are not required where the value of A in the formula (iv) is —N(R")—C(O)—R". Where the value of A is OR" any transesterification or transalkoxylation catalyst may be used. Suitable transesterification catalysts have been described for example in U.S. Pat. No. 3,133,111 and other publications and include alkali metal alkoxides, Sn compounds, Ti compounds, Ba compounds as well as standard strong alkali compounds. Strong acid compounds should be avoided as they tend to polymerise the oxyalkenyl groups. Particularly useful catalysts include alkali metal alkoxides, e.g. Na methoxide and titanium compounds, e.g. tetraisopropyl titanate. The alkoxide catalysts and strongly acidic or basic catalysts should preferably be avoided where the organosilicon compound is to be a siloxane as they tend to cause some rearrangement of the siloxane polymers. Where a catalyst is used it is generally employed in sufficient amounts to give from 0.01 to about 5% by weight based on the weight of the organosilicon reagent compound. It is particularly preferred to ensure any titanium catalyst, if used, is kept to a minimum as excess may inhibit the radiation cure of the compositions according to the invention. Most preferably the level is kept below 1000 ppm of titanium based on the total weight of the polymer.

Organosilicon compounds according to the first aspect of the invention are crosslinkable materials which can form an elastomeric or resinous film or composition upon exposure to radiation in the presence of an appropriate catalyst e.g. actinic radiation, electron beam, gamma rays, X-rays or laser emission. They are particularly useful when applied to a substrate as a thin coating and are caused to crosslink by exposing the coated substrate to ultraviolet or electron beam radiation as their cure rate in such systems is very fast. Thus they are particularly useful in compositions for the formation of release coatings on cellulosic or other substrates, e.g. paper, polyester film and polyethylene, which may be used in the production of non-stick surfaces for food contact, packaging or as coatings which release pressure sensitive adhesives, for example as applied to labels and laminates. Another area where such compounds may advantageously be used is conformal coating e.g. in electronic applications.

According to another aspect of the invention there is provided a composition which will cure upon exposure to radiation, which comprises at least one organosilicon compound according to the first aspect of the invention and an initiator.

Radiation which may cause the composition to cure varies from very high energy radiation to lower energy radiation but is preferably radiation in the ultraviolet range or the electron beam range. UV radiation is preferred as it provides the best combination of convenience, economy, efficiency and safety for a fast curing composition. In case of the composition being adapted to curing under radiation by ultraviolet light the initiator will be a photoinitiator. While UV radiation in the range of wavelengths of from 190 to 350 nm is preferred the use of sensitisers may allow a widening of efficient wavelengths into the visible light. Suitable sensitisers are well known in the art and have been described in great detail in numerous publications. They include as the most well known material benzophenone. Curing rate of the compositions according to the invention when exposed to radiation is fast. In most applications a composition coated as a thin film will cure to an elastomeric or resinous material in less than 30 minutes, more typically, in less than 5 minutes. It may be as quick as 1 to 30 seconds. Upon exposure to radiation, the film will be tackfree in an even shorter time.

Suitable initiators may be onium salts or certain nitrobenzyl sulfonate esters. Onium salts which are useful as initiators in the compositions of the present invention are known and have been described e.g. in the above mentioned patent specification E.P. 105 341. They are materials of the general formulae $Z_2I^+MX_n^-$, $Z_3S^+MX_n^-$, $Z_3Se^+MX_n^-$, $Z_4P^+MX_n^-$ and $Z_4N^+MX_n^-$ where each Z independently denotes an organic group having from 1 to 30 carbon atoms and $MX_n^-$ is a non-basic, non-nucleophilic anion, for example $BF_4^-$, $PF_6^-$, $AsF_6^-$, $SbF_6^-$, $SbCl_6^-$, $HSO_4^-$ and $ClO_4^-$. Nitrobenzyl sulfonate esters which are useful as initiators in the compositions of the present invention have the general formula

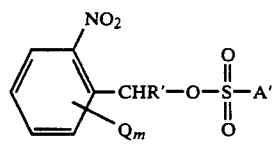

(v)

wherein A' denotes an alkyl group, an aryl group, an alkylaryl group, a halogen substituted alkyl, aryl or alkylaryl group or a group $C_6H_4$—$SO_3$—$CHR'C_6H_{4-m}Q_m(NO_2)$, R' denotes hydrogen or methyl, Q denotes a hydrocarbon group, a group $NO_2$ or an organosilicon compound, provided Q is not an acidic group, m has a value of 0, 1 or 2. These nitrobenzyl sulfonate catalysts are described in our copending application G.B. 912442.8. These materials are known and have also been described together with their preparation method e.g. in Journal of Photopolymer Science and Technology, Volume 3, Nr 3 (1990), pages 259 to 273 and in Macromolecules, 1988, 21, pages 2001 to 2006. A preferred nitrobenzyl derivative has a value for m equal to 1, while Q denotes a $NO_2$ group in the ortho position in relation to the —$CHR'OS(O)_2A'$ group and A' denotes a nitrophenyl group, wherein the nitro group is in the para position relative to the sulphonic group. Preparation of the preferred nitrobenzyl derivative may be via the reaction of nitrotosylchloride with dinitrobenzylalcohol.

Initiators may be present in any proportions which will effect curing of the composition. As with any catalytic system it is preferred to restrict the amount of initiator used as much as possible. We have found that efficient amounts of initiator tend to be in the range of from 0.1 to 10% by weight based on the weight of the organosilicon compound, preferably 1 to 5%. The initiators may be introduced into the composition by mere mixing of the initiators with the organosilicon compounds. After exposure to radiation the composition will then cure to an elastomeric material.

Compositions according to the invention may also comprise a number of other ingredients. Optional additional ingredients include photosensitisers, as mentioned above, fillers, high release additives, e.g. vinylated organosilicon resins, reactive diluents, including silanes according to application WO 91/11467, photochromic materials, dyes, colorants, preservatives, fragrances etc. Most importantly, however, other radiation curable compounds may be included in the composition. Examples of such compounds are epoxy functional siloxanes, as have been disclosed for example in G.B. patent application 1 600 613. Such materials will affect the cure rate of the composition and the physical characteristics of the finished cured product. Other ingredients as mentioned herein may be present in any amount provided they do not inhibit the curing ability of the composition. Preferably, however, such ingredients, in particular any epoxy functional siloxanes which may be present, should not exceed 40% by weight of the combined weight of the organosilicon compound and such ingredient. Most preferably no more than 25% by weight should be occupied by said other ingredients. Compositions are most useful as coatings, especially release coatings for backing paper for self-adhesive labels. They may also be self-supporting, e.g. as carriers of pharmaceutical or agrochemical material. This is of particular interest where controlled release of certain materials is envisaged, especially where these materials are unstable, e.g. to heat, but are not affected by radiation.

Curing itself may be achieved in any of the known ways, including passing a coated substrate under the desired source of radiation, e.g. a UV lamp, at a predetermined rate and exposing a complete coated substrate to radiation by switching on the required energy source for a predetermined time.

Also included in the scope of the invention are substrates which have been coated with a release coating resulting from coating the substrate with a composition according to the invention and curing the composition by exposure to radiation.

There now follow a number of examples to illustrate the invention. All parts and percentages are by weight unless otherwise mentioned and Me denotes a methyl group.

EXAMPLE 1

0.31 mole of the sodium salt of N-methylacetamide was stirred as a suspension in 100ml of toluene under a nitrogen blanket at ambient temperature. 0.29 mole of tetrachlorosilane was added dropwise to the reaction mixture. Solid sodium chloride was removed by filtration after a 4 hour reaction. Toluene was also removed leaving a pale yellow oily liquid which was characterised by nuclear magnetic resonance spectroscopy, infrared spectroscopy, gas chromatography and mass spectrometry as tetrakis(N-methylacetamido)silane. 0.0144 mole of this silane was dissolved in 100 ml of toluene. A second toluene solution which contained 0.0646 mole of an α,w-silanol endblocked polydimethylsiloxane having on average 8 silicon atoms per molecule was added dropwise to the solution under stirring. After a further hour of stirring, 0.03966 mole of 4-ethenyloxy-1-butanol was added dropwise to the solution. An exothermic reaction was observed. After 2 hours N-methylacetamide was removed by distillation giving a pale yellow liquid which was characterised by gas chromatography, mass spectroscopy and nuclear magnetic resonance spectroscopy as [CH$_2$=CHO—(CH$_2$)$_4$—O]$_3$—SiO—[-Si(CH$_3$)$_2$O]$_8$—Si[O—(CH$_2$)$_4$—OCH=CH$_2$]$_3$.

EXAMPLE 2

40 parts of a siloxane polymer having the general structure Me—[Si(Me)$_2$O]$_4$—[SiMeHO]$_5$—SiMe$_3$ were added slowly to 50 parts of trimethoxyvinylsilane, containing 0.89 parts of a platinum containing complex at 70° C. After refluxing the mixture for 24 hours, excess trimethoxyvinylsilane was removed to yield 75 parts of a polymer having the average formula

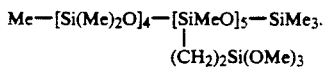

Me—[Si(Me)$_2$O]$_4$—[SiMeO]$_5$—SiMe$_3$.
         |
       (CH$_2$)$_2$Si(OMe)$_3$ 116 parts of 4-ethenyloxy-1-butanol and 0.058 part of titanium acetylacetonate in isopropanol were added. The reaction mixture was heated to 100° C. under reduced pressure for a period of 24 hours resulting in a polymer of the average structure

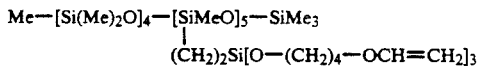

Me—[Si(Me)$_2$O]$_4$—[SiMeO]$_5$—SiMe$_3$
         |
       (CH$_2$)$_2$Si[O—(CH$_2$)$_4$—OCH=CH$_2$]$_3$ having 16% residual unreacted silicon-bonded methoxy groups.

EXAMPLE 3

100 parts of a siloxane polymer having the general structure Me—[Si(Me)$_2$O]$_4$—[SiMeHO]$_5$—SiMe$_3$ were added slowly to 100 parts of dimethoxymethylvinylsilane containing 2 parts of a platinum containing complex at 70° C. After refluxing the mixture for 24 hours excess dimethoxymethylvinylsilane was removed to yield 180 parts of a polymer having the average formula Me—[Si(Me)$_2$O]$_4$—[SiMeO]$_5$—SiMe$_3$ .
         |
       (CH$_2$)$_2$SiMe(OMe)$_2$ 200 parts of 4-ethenyloxy-1-butanol and 0.058 part of tetraisopropyltitanate were added. The reaction mixture was heated to 100° C. under reduced pressure for a period of 24 hours resulting in a polymer of the average structure

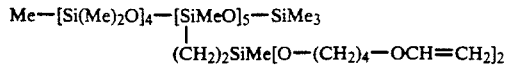

Me—[Si(Me)$_2$O]$_4$—[SiMeO]$_5$—SiMe$_3$
         |
       (CH$_2$)$_2$SiMe[O—(CH$_2$)$_4$—OCH=CH$_2$]$_2$ having 14% residual unreacted silicon-bonded methoxy groups.

EXAMPLE 4

A mixture of 0.5 g of the silane made in Example 1 and 0.05 g of K185, a sulphonium salt supplied by Degussa, was placed in a quartz tube and irradiated using a medium pressure mercury lamp having an output of 150W. Although some miscibility problems were seen the sample cured to a hard solid within 60 minutes of exposure to the radiation.

EXAMPLES 5 AND 6

In 98 parts of the product obtained respectively in Examples 2 and 3 were dissolved 2 parts of bis(dodecylphenyl) iodonium hexafluoroantimonate. The mixture was coated at a loading of 5 g/m$^2$ onto Kammerer AV100 paper which was subsequently exposed to ultraviolet radiation from two "H" bulbs of a UV Fusion coater machine, each operating at 125W/cm$^2$ focussed power. The material cured after an exposure time of less than 0.7 second (a belt speed of almost 50 m/s) giving a tack free crosslinked film. These coatings were postcured at 60° C. for 15 minutes. Laminates were prepared from these coatings using an acrylic Tesa ® testband tape (A7475) to test the release properties of the coatings. To pull apart the lamina at 180° and a rate of 0.3 m/min, using a 2.5 cm wide sample, a release force was required of 19.41 and 16.38 g/cm respectively.

EXAMPLES 7 TO 18

1 part of a siloxane having the general formula

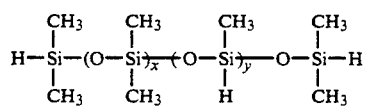

and a stoichiometric excess (5%) of vinyltrimethoxysilane were reacted in the presence of a catalytic amount of a vinylsiloxane complex of platinum to yield a compound of the general formula

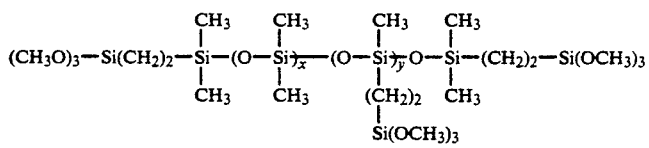

This reaction was followed by the transesterification reaction of this compound with a stoichiometric amount of hydroxybutyl vinylether at 120° C. under reduced pressure (75 mbar) in the presence of a catalytic amount of tetraisopropyl titanate. The resulting polymer had the structure

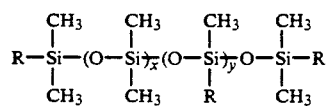

where R denotes —$(CH_2)_2Si[O(CH_2)_4—OCH=CH_2]_3$
and x and y are average values as defined in the attached Table I.

TABLE I

| Example | x | y | Molecular Weight |
|---------|------|-----|------------------|
| 7 | 18 | 0 | 2,258 |
| 8 | 17.5 | 0.5 | — |
| 9 | 17 | 1 | — |
| 10 | 15.5 | 2.5 | 3,163 |
| 11 | 43 | 0 | 4,108 |
| 12 | 41.8 | 1.2 | — |
| 13 | 40.5 | 2.5 | 4,983 |
| 14 | 68 | 0 | — |
| 15 | 66.2 | 1.8 | — |
| 16 | 64.5 | 3.5 | — |
| 17 | 98 | 0 | 8,178 |
| 18 | 95 | 3 | 9,300 |

EXAMPLE 19

In Q parts of the product obtained in Example 18 were dissolved 100-Q parts of bis(dodecylphenyl) iodonium hexafluoroantimonate. The mixture was coated at a loading of 5 g/m² onto Kammerer AV100 paper which was subsequently exposed to ultraviolet radiation from two "H" bulbs of a UV Fusion coater machine, each operating at 125 W/cm² focussed power. The material cured to a point of no migration. This means that the when an acrylic adhesive was placed on the coating, no migration of any coating to the adhesive occurred. Such migration can easily be detected by observing a reduced adhesive strength of the acrylic adhesive after it was laminated and delaminated from the coated substrate. Where Q was 2, cure to non-migration required 480 mJoules/cm². For Q=3, this was reduced to 120 mJoules/cm², and for Q=4, to 75 mJoules/cm².

EXAMPLES 20 TO 27

In 98 parts of the product obtained respectively in Examples 7 to 9 and 11 to 15 were dissolved 2 parts of bis(dodecylphenyl) iodonium hexafluoroantimonate. The mixture was coated at a loading of 5 g/m² onto Kammerer AV100 paper which was subsequently exposed to ultraviolet radiation from two "H" bulbs of a UV Fusion coater machine, each operating at 125 W/cm² focussed power The material cured after an exposure time of less than 0.7 second (a belt speed of almost 50 m/s) giving a tack free crosslinked film. These coatings were postcured at 60° C. for 15 minutes. Laminates were prepared from these coatings using an acrylic Tesa ® testband tape (A7475) to test the release properties of the coatings. To pull apart the lamina at 180° and a rate of 10 m/min, using a 2.5 cm wide sample, a release force A was required as indicated (in g/cm) in Table II below. The coated materials were aged for 1 day at 50° C., giving release force values B, 7 days at room temperature, giving release force values C and for 7 days at 50° C., giving release force values D. Also measure was the subsequent adhesive strength, which is the % adhesive strength of the delaminated material compared with the initial adhesive strength. This was measured on the same samples as above, but delamination rate was at 0.3 m/minute. Results (in %) are given in Table II under E, F, G and H respectively for the samples aged for 1 day at room temperature, 1 day at 50° C., 7 days at room temperature and 7 days at 50° C.

TABLE II

| Example | A | B | C | D | E | F | G | H |
|---------|----|----|----|-----|-----|-----|----|----|
| 20 | 38 | 80 | 22 | 106 | 93 | 99 | 91 | 90 |
| 21 | 32 | 21 | 32 | 66 | 91 | 94 | 87 | 89 |
| 22 | 28 | 59 | 60 | 101 | 93 | 92 | 88 | 90 |
| 23 | 17 | 22 | 20 | 27 | 99 | 99 | 81 | 81 |
| 24 | 19 | 27 | 20 | 28 | 85 | 85 | 90 | 89 |
| 25 | 18 | 30 | 23 | 30 | 100 | 100 | 98 | 95 |
| 26 | 12 | 19 | 50 | 24 | 95 | 99 | 92 | 91 |
| 27 | 17 | 34 | 24 | 24 | 92 | 86 | 89 | 92 |

It becomes clear from the example that the higher viscosity materials (those having a degree of polymerisation of 45 or more) perform better than those of lower viscosity.

EXAMPLES 28 TO 35

The tests of Examples 20 to 27 were repeated, but this time with a rubber adhesive instead of an acrylic adhesive. Results are given in Table III.

TABLE III

| Example | A | B | C | D | E | F | G | H |
|---------|----|----|----|---|-----|-----|-----|-----|
| 28 | 11 | 12 | 12 | 9 | 97 | 100 | 91 | 100 |
| 29 | 8 | 35 | 10 | 7 | 96 | 100 | 86 | 100 |
| 30 | 17 | 11 | 21 | 9 | 93 | 100 | 90 | 1000 |
| 31 | 7 | 8 | 7 | 7 | 100 | 100 | 95 | 100 |
| 32 | 4 | 3 | 4 | 4 | 97 | 100 | 100 | 100 |
| 33 | 6 | 4 | 5 | 5 | 85 | 100 | 100 | 100 |
| 34 | 6 | 7 | 7 | 7 | 99 | 100 | 100 | 100 |
| 35 | 5 | 6 | 5 | 5 | 100 | 100 | 100 | 100 |

EXAMPLE 36

In 97.5 parts of the product obtained in Example 18 were dissolved 2.5 parts of bis(dodecylphenyl) iodonium hexafluoroantimonate. The mixture was coated at a loading of 5 g/m² onto a polyolefin film which was subsequently exposed to electron beam radiation (2.5 mRads). The material cured giving a tack free crosslinked film with a non-migratory surface.

COMPARATIVE EXAMPLES 1 AND 2

0.072 mole of tetraethoxysilane and 0.29 mole of 4-ethenyloxy-1-butanol were mixed together. 0.0037 mole of sodium methoxide was added as a 10% solution in methanol. The resulting mixture was reacted for 5 hours at 100° C. during which ethanol was continually removed. The finished product was treated with activated charcoal and neutral aluminium oxide and filtered. Nuclear magnetic resonance spectroscopy confirmed the product as tetrakis[4-(ethenyloxy)-1-butanoxy]silane. A small amount of $[CH_2=CHO—(CH_2)_4—O]_3$—Si—O—$Si[O—(CH_2)_4—OCH=CH_2]_3$ was also found.

The reaction was repeated using as catalyst tetraisopropyl titanate, resulting in similar reaction products.

COMPARATIVE EXAMPLE 3

In 98 parts of the product obtained in Comparative Example 2 were dissolved 2 parts of bis(dodecyl phenyl) iodonium hexafluoroantimonate. The mixture was coated as a 2 mm thick wet film onto polyester sheeting, which was subsequently exposed to ultraviolet radiation from two "H" bulbs of a UV Fusion coater machine. The material cured after 2 seconds of exposure giving a highly crosslinked brittle film.

That which is claimed is:

1. A composition which will cure upon exposure to radiation comprising:

(I) at least one organosilicon compound having a having a siloxane portion and at least one group of the general formula $$—OR'OCH=CHR''  \quad (i)$$

linked to a silicon atom via an Si—O—C bond, wherein R' is selected from the group consisting of divalent hydrocarbon radicals having up to 8 carbon atoms and groups of the formula —R°—(OR°-)$_n$—, wherein R° denotes an alkylene group having up to 6 carbon atoms and n has a value of from 1 to 12, R" is selected from the group consisting of hydrogen and alkyl groups having up to 10 carbon atoms; and (II) an initiator.

2. A composition according to claim 11, characterised in that the radiation is UV radiation, and the initiator is a photoinitiator.

3. A composition according to claim 2 wherein the photoinitiator is selected from an onium salt selected from the group consisting of those with the general formulae $Z_2I^+MX_n^-$, $Z_3S^+MX_n^-$, $Z_3Se^+MX_n^-$, $Z_4P^+MX_n^-$ and $Z_4N^+MX_n^-$ where each Z independently denotes an organic group having from 1 to 30 carbon atoms and $MX_n^-$ is a non-basic, non-nucleophilic anion or from a nitrobenzyl sulfonate esters of the general formula

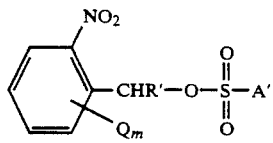  (v)

wherein A' is selected from the group consisting of alkyl groups, aryl groups, alkylaryl groups, halogen substituted alkyl groups, halogen substituted aryl groups, halogen substituted alkylaryl groups, nitro substituted aryl groups, nitro substituted alkylaryl group, aryl groups having halogen and nitro substituents, alkaryl groups having halogen and nitro substituents and the group —C$_6$H$_4$—C$_6$H$_4$—SO$_3$—CHR'C$_6$H$_{4-m}$Q$_m$(NO$_2$), R' is selected from the group consisting of hydrogen, methyl and nitro substituted aryl, Q is selected from the group consisting of hydrocarbon groups, the group NO$_2$ and organosilicon compounds, provided Q is not an acidic group, m has a value of 0, 1 or 2.

4. A composition according to claim 3, wherein the non-basic, non-nucleophilic anion is selected from the group consisting of BF$_4^-$, PF$_6^-$, AsF$_6^-$, SbF$_6^-$, SbCl$_6^-$, HSO$_4^-$ and ClO$_4^-$.

5. A composition which will cure upon exposure to radiation which comprises:

(I) at least one organosilicon compound having at least two organosilicon units, at least one of which has the general formula $$O_{\frac{4-a-b-c-d}{2}}Si(—OR'OCH=CHR'')_aR_bY_cX_d \quad (ii)$$

any other organosilicon units, if present in the organosilicon compound, having the general formula $$SiR_bO_{\frac{4-b}{2}} \quad (iii)$$

wherein R' is selected from the group consisting of divalent hydrocarbon radicals having up to 8 carbon atoms and groups of the formula —R°—(OR°-)$_n$—, wherein R° denotes an alkylene group having up to 6 carbon atoms and n has a value of from 1 to 12, R" is selected from the group consisting of hydrogen and alkyl groups having up to 10 carbon atoms, R is selected from the group consisting of monovalent hydrocarbon groups having up to 18 carbon atoms and substituted hydrocarbon groups having up to 18 carbon atoms, X is a hydrocarbonoxy group having up to 8 carbon atoms, Y is a group having the formula $$R'SiR_bO_{\frac{3-b}{2}},$$

wherein R' links the silicon atom of unit (ii) to the silicon atom of the group Y, a has a value of from 1 to 4, b and b' have a value of from 0 to 3, c has a value of 0 or 1, d has a value of from 0 to 2, a+b+c+d having a value of from 1 to 4, provided at least one of 4-a-b-c-d in (ii) and 3-b' in Y is not zero, the oxygen atoms, where present in $$SiO_{\frac{4-a-b-c-d}{2}}, SiO_{\frac{3-b}{2}}, \text{ and } SiO_{\frac{4-b}{2}}$$

linking silicon atoms to form siloxane bonds; and
(II) an initiator.

6. A composition according to claim 5, wherein the radiation is UV radiation, and the initiator is a photoinitiator.

7. A composition according to claim 6 wherein the photoinitiator is selected from an onium salt selected from the group consisting those with the general formulae $Z_2I^+MX_n^-$, $Z_3S^+MX_n^-$, $Z_3Se^+MX_n^-$, $Z_4P^+MX_n^-$ and $Z_4N^+MX_n^-$ where each Z independently denotes an organic group having from 1 to 30 carbon atoms and $MX_n^-$ is a non-basic, non-nucleophilic anion or from a nitrobenzyl sulfonate esters of the general formula

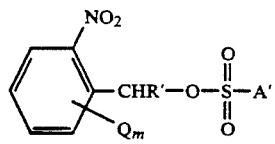  (v)

wherein A' is selected from the group consisting of alkyl groups, aryl groups, alkylaryl groups, halogen substituted alkyl groups, halogen substituted aryl groups, halogen substituted alkylaryl groups, nitro substituted aryl groups, nitro substituted alkylaryl group, aryl groups having halogen and nitro substituents, alkaryl groups having halogen and nitro substituents and the group —C$_6$H$_4$—C$_6$H$_4$—SO$_3$—CHR'C$_6$H$_{4-m}$Q$_m$(NO$_2$), R' is selected from the group consisting of hydrogen, methyl and nitro substituted aryl, Q is selected from the group consisting of hydrocarbon groups, the group NO$_2$ and organosilicon compounds, provided Q is not an acidic group, m has a value of 0, 1 or 2.

8. A composition according to claim 7 wherein the non-basic, non-nucleophilic anion is selected from the group consisting of $BF_4^-$, $PF_6^-$, $AsF_6^-$, $SbF_6^-$, $SbCl_6^-$, $HSO_4^-$ and $ClO_4^-$.

9. A method of treating a solid substrate with an organosilicon composition, which comprises:

(A) coating said substrate with a composition comprising:

(I) at least one organosilicon compound having at least two organosilicon units, at least one of which has the general formula $$O_{\frac{4-a-b-c-d}{2}}Si(-OR'OCH=CHR'')_a R_b Y_c X_d \quad \text{(ii)}$$

any other organosilicon units, if present in the organosilicon compound, having the general formula $$SiR_b O_{\frac{4-b}{2}} \quad \text{(iii)}$$

wherein R' is selected from the group consisting of divalent hydrocarbon radicals having up to 8 carbon atoms and groups of the formula $-R^\circ-(OR^\circ)_n-$, wherein $R^\circ$ denotes an alkylene group having up to 6 carbon atoms and n has a value of from 1 to 12, R'' is selected from the group consisting of hydrogen and alkyl groups having up to 10 carbon atoms, R is selected from the group consisting of monovalent hydrocarbon groups having up to 18 carbon atoms and substituted hydrocarbon groups having up to 18 carbon atoms, X is a hydrocarbonoxy group having up to 8 carbon atoms, Y is a group having the formula $$R'SiR_b O_{\frac{3-b}{2}}$$

wherein R' links the silicon atom of unit (ii) to the silicon atom of the group Y, a has a value of from 1 to 4, b and b' have a value of from 0 to 3, c has a value of 0 or 1, d has a value of from 0 to 2, a+b+c+d having a value of from 1 to 4, provided at least one of 4-a-b-c-d in (ii) and 3-b' in Y is not zero, the oxygen atoms, where present in $$SiO_{\frac{4-a-b-c-d}{2}}, SiO_{\frac{3-b}{2}}, \text{ and } SiO_{\frac{4-b}{2}}$$

linking silicon atoms to form siloxane bonds; and
(II) an initiator; and
(B) exposing said coated substrate to radiation.

10. A method according to claim 9 wherein said radiation is ultraviolet radiation and wherein said substrate is a cellulosic, polyester or polyethylene substrate.

11. A solid substrate coated with an organosilicon composition according to the method of claim 9.

* * * * *